United States Patent

[11] 3,633,615

[72] Inventor Charles F. Rhodes, Jr.
Richardson, Tex.
[21] Appl. No. 20,688
[22] Filed Mar. 18, 1970
[45] Patented Jan. 11, 1972
[73] Assignee Sun Oil Company (Delaware)
Dallas, Tex.

[54] CONTROL SYSTEM
7 Claims, 5 Drawing Figs.

[52] U.S. Cl. .................................................... 137/554,
335/234
[51] Int. Cl. .................................................... F16k 37/00,
H01f 7/08
[50] Field of Search ........................................ 251/65,
129, 137, 141; 137/554; 335/17, 234, 153, 154,
205

[56] References Cited
UNITED STATES PATENTS
3,368,788  2/1968  Padula.......................... 251/65
3,401,362  9/1968  Spiroch et al................. 335/17
3,502,105  3/1970  Ernyei et al................... 137/554 X Primary Examiner—Henry T. Klinksiek
Attorneys—George L. Church, Donald R. Johnson, Wilmer E. McCorquodale, Jr. and John E. Holder ABSTRACT: The particular embodiment described herein as illustrative of one form of the invention utilizes a magnetically actuated reed switch arranged in coincidence with a flux path of an electromagnetically operated valve, which reed switch is actuated when the valve is moved to one of its selectively operable positions, and thereby changes a characteristic of the flux path, the actuation of the reed switch being in response to the change in the flux path characteristic.

INVENTOR
CHARLES F. RHODES, JR.
ATTORNEY

3,633,615

CONTROL SYSTEM

BACKGROUND OF THE INVENTION

This invention relates to a control system and more particularly, to an apparatus for detecting the operation of an electromagnetically operated control system.

In the operation of various control systems such as that disclosed with respect to the valve control in the present application, it is often necessary or desirable to provide an indication of the operative position of a control or valve element to thereby determine what mode of operation the control element is in. For example, if a valve is used to control a fluid flow and an electrical signal has been applied to the valve to operate the valve element in one mode or another, it is desirable to know which mode the element is in. This may be true even though the electrical circuit has been operated to place the valve in a particular mode, in that the actual position of the valve element may not follow the directed operation of the system, and thus, if a malfunction has occurred, a simple indication of which mode has been electrically programmed will not necessarily correspond to the actual position of the valve element. For example, if an electromagnetic valve is utilized to operate a valve element and an electrical circuit has been switched to place the valve element in a particular position, if a light or the like is used to indicate that such circuit has been operated to place the valve in that position and the valve element in fact has not moved to such position, the light will give an erroneous indication. Also, in valve control systems or other such control systems, a typical solenoid valve requires a continuous flow of current through a coil to hold the control element or valve plunger in one or the other of the operative positions. An improved valve system now available includes a valve element which is operated by means of a permanent magnet-latching circuit that can be controlled by a momentary current pulse or continuous current flow. Such a valve system is sold under the trademark "MAGNELATCH" by the Skinner Company. Such valves may be operated by a momentary current pulse of only a few milliseconds, whereas a convention solenoid valve requires continuous current flow to hold a plunger in position. Thus there is less heat rise and power consumption in the "MAGNELATCH" system. The system, because of its operation, has application in solid state logic circuitry. In such a system, the desirability of having an indicating device which shows the actual position of the valve element is even more apparent, since the current which has positioned the valve element in its operative position may not be applied to the valve system at a particular time, and thus would be unavailable to provide such an indicating circuit path.

It is therefore an object of the present invention to provide a new and improved apparatus for detecting the operation of a control system.

SUMMARY OF THE INVENTION

With this and other objects in view, the present invention contemplates an apparatus for detecting the operation of a control device which control device has an element movable between operative positions by an electromagnetically operated system defining a changing magnetic flux path for moving the element between positions. Means are provided for detecting changes in the flux path indicative of such element position movement to provide an indication of the operation of the element.

DESCRIPTION OF THE PREFERRED EMBODIMENTS

Figure 1:
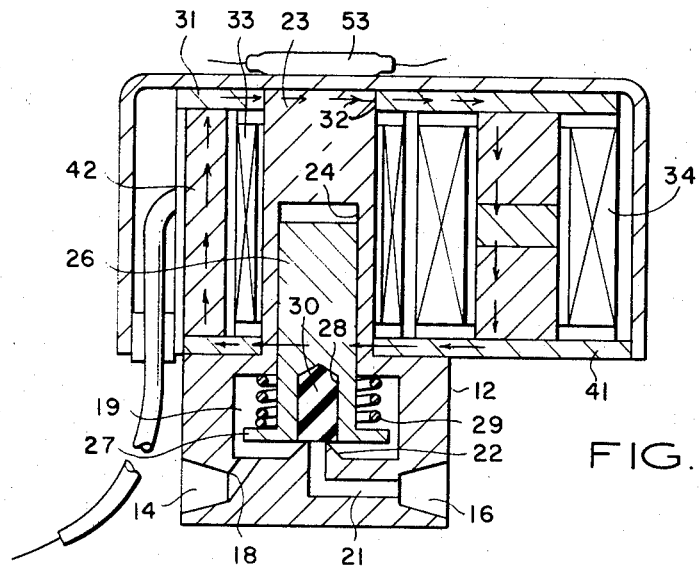
FIG. 1 shows an electromagnetically operated valve in a first operative position.

Referring first to FIG. 1 of the drawings, an electrically operated valve is shown having a body portion 12 with inlet and outlet ports 14, 16, respectively formed transversely through the wall of the body portion. A first flow passage 18 connects the inlet port with an internal chamber 19 within the valve body. A second passageway 21 connects the outlet port with a raised valve seat 22 formed on the bottom of the internal chamber. An upper portion 23 of the valve body has a cylindrical chamber 24 formed therein for receiving a valve plunger 26. The valve plunger is formed of a cylindrical rod sized for reception within the bore, and having an outwardly extending flange 27 formed on its lower end. The lower end of the plunger also has a recess 28 formed therein which is sized to fit over the valve seat 22 and thereby form a sealing contact therewith. A plunger spring 29 is positioned in the chamber about the plunger 26 between the top side of the internal chamber 19 and the outwardly extending flange 27 on the plunger. A soft synthetic insert 30 is positioned within the recess 28 in the plunger and provides a means for sealing about the flange or orifice formed by the upper projecting end of passageway 21. In the operation of the valve, the plunger 26 if forced downwardly by means of the spring 29 so that the synthetic insert 30 is caused to be forced downwardly over the orifice and thereby close the orifice.

The electrical portion of the valve is assembled about that portion of the apparatus described above and includes a saddle plate or upper flux plate 31 having an opening 32 therein for receiving the upper portion 23 of the valve body. A coil assembly within the electrical system consists of a main or latch coil 33 and a switch coil 34 having the necessary circuitry and external leads to provide electrical current to the coil assembly. Upper and lower pole pieces 36, 38 respectively formed of magnetic steel constitute portions of a magnetic switch which has a small permanent magnet 39, the polarity of which can be reversed, positioned between the pole pieces 36, 38. A sole plate 41 is positioned along the lower surface of the assembly forming a lower flux plate and having an opening therein for receiving the lower end of the upper portion 23 of the valve body. The sole plate also is positioned on top of an annular shoulder formed between the valve body 12 and the upper portion 23 thereof. A large permanent magnet or saddle coupling 42 is positioned vertically between the saddle plate 31 and sole plate 41 to provide a permanent magnet in the flux circuit of the electrical system. A plastic or the like encasing material may be placed over the top and side portions of the entire assembly.

In the operation of the apparatus described above with respect to FIGS. 1 and 2 of the drawings, the coil circuits operate on a direct current. The valve however, is designed to function on AC and DC current or separate battery packs, since regardless of the input supply, AC is rectified in the coil assembly, as will be shown with respect to the circuit diagram in FIG. 3. However, current applied to the coil assembly must be of the opposite polarity of a previous pulse applied thereto in order for the valve to change its operative function as also will be described later. Normally when the valve is in a release position, the force of the plunger spring on the plunger 26 is sufficient to cause the insert 30 within the recess to seal the orifice. In this position, the magnetic flux generated by the latch coil 33 is in phase with the magnetic flux generated by the switch coil 34. The plunger magnetic circuit includes the upper portion 23 of the valve body and an air gap formed between the valve plunger 26 and the upper end of the cylindrical chamber 24 to provide a high reluctance path. In any event, the reluctance path is higher than that afforded by the saddle plate 31 and the sole plate 41. Therefore, following the path of least reluctance, the combined fluxes of the latch coil 33 and the switch coil 34 passes through an outer circuit consisting of the large vertical permanent magnet 42, the upper flux plate 31, the vertical assembly comprised of the magnetic pole pieces 36, 38 and the small permanent magnet 39, and the lower flux plate 41. In this condition, the magnetic circuit has no effect on the plunger 26 within the valve body and the spring force holds the plunger of the valve seat 22.

When a momentary pulse of direct current or a steady current of correct polarity and duration is provided to the coil assembly, it causes the small magnet 39 to switch its polarity and repel the flux generated by the large magnet 42. This action causes the full flux output of the large magnet to shunt across the plunger magnetic circuit because the plunger circuit now has less reluctance than the outer circuit as shown in FIG. 1. When the magnetic flux travels through the plunger circuit comprised of the upper valve portion 23, and plunger 26 and an arc gap formed between the valve portion 23 and plunger 26, it causes the plunger to move upwardly against the top of the chamber 24 within the upper portion of the valve body and thereby move the insert 30 away from the top of the orifice, thus permitting flow through the valve from the inlet port 14 to the outlet port 16. The magnetic circuit described above will remain stable and the plunger will remain in the upward or latch position until a pulse of an opposite polarity is provided to the coil assembly. In the meantime, no current is required to keep the plunger against the stop, since the magnetic circuit is permanently energized until the release position of FIG. 1 is programmed by causing a current of opposite polarity to be applied to the coil assembly.

Figure 3:
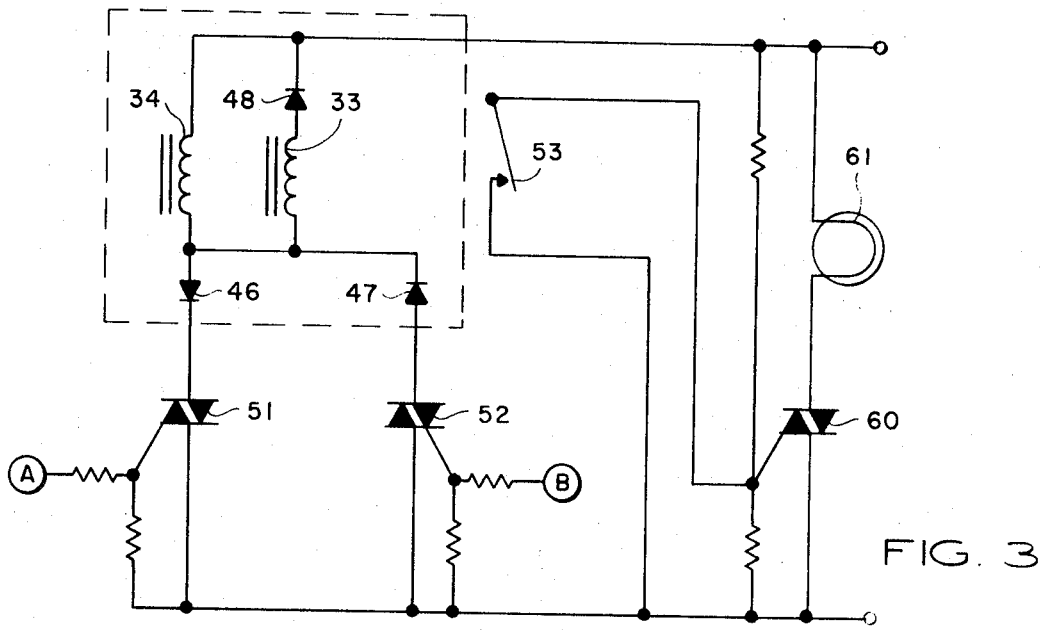
FIG. 3 shows a circuit diagram for operating the valve systems of FIGS. 1 and 2, and in addition, a means for detecting the operation of the valve in accordance with the principles of the present invention.

Referring next to FIG. 3 of the drawings, a circuit diagram shows the circuit of the MAGNELATCH valve together with associated control and detection circuitry in accordance with the present invention. That portion of the circuitry which is integrally assembled with the latch valve is enclosed by a dotted line. Such valve portion of the circuitry includes the latch coil 33 and switch coil 34, together with diodes 46, 47, and 48 for rectifying alternating current which may be applied to the system and for affording proper control of the system. A gated power control device 51 such as a TRIAC is in series with diode 46. Another gated power control device 52 is in series with diode 47.

To place the valve system in the release position as shown in FIG. 1, a twenty millisecond or longer pulse of 12 volts is placed on point B, while point A is simultaneously placed at common or zero potential. Thus device 52 is gated to conduct for at least 20 milliseconds. Device 51 will not conduct at this time, since its gate is at a common potential, therefore the current applied to the valve circuit through the conduction of device 52 will be applied to both the switch coil and latch coil in the same direction through diodes 47 and 48. This condition causes latching of the valve, whereupon current flow may be ceased, since the valve will remain in the latch position regardless of the application of current there to the latching coil.

Figure 2:
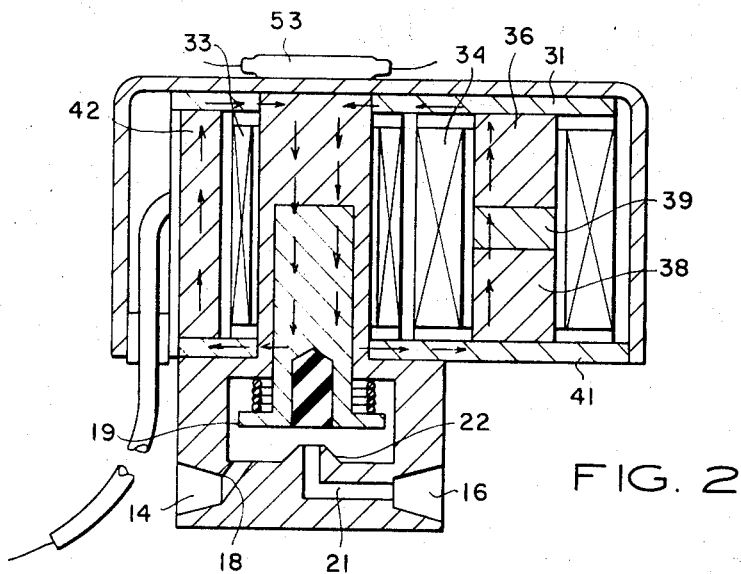
FIG. 2 shows the valve of FIG. 1 in a second operative position.

As shown in FIG. 2, because of the arrangement of the coils, this mode of operation sets up opposing flux flow paths causing the flux output of the permanent magnet 42 associated with the latch coil to shunt across the plunger magnetic circuit, which now has less reluctance, to cause the plunger to move upward against the upper end of the valve plunger recess.

To release the MAGNELATCH valve, a pulse of opposite polarity is placed on the circuit, that is, a 12-volt pulse is placed on the point A while point B is simultaneously placed at common potential. Therefore, device 51 will conduct for the period of at least 20 milliseconds to release the valve whereupon current flow may be ceased. Device 52 does not conduct, since its gate is at a common potential. In this mode, the switch coil 34 continues to pass current in one direction permitted by the rectifier 46. However, due to the rectifier 48 in the circuit of the latch coil 33, current does not flow to permit operation of the latch coil. It is noted that the current flow however, to the switch coil 34 is in an opposite direction to that of the latch position described previously, and thus the path of least reluctance is now provided by the magnetic circuit shown with respect to FIG. 1 of the drawings, it being remembered that the latch coil is not operating.

Figure 5:
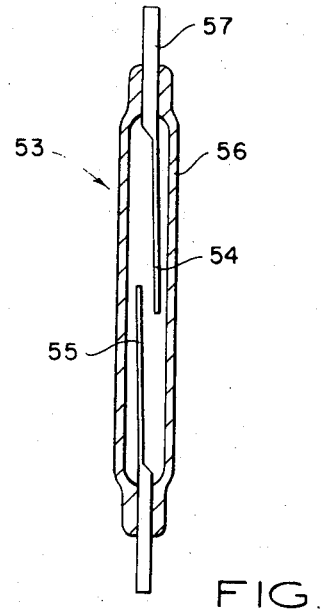
FIG. 5 shows a reed switch for use with the present invention.

Adjacent the dotted line about the coil circuitry of FIG. 3, a reed switch 53 is shown in position for detecting the magnetic condition of flux flow paths throughout the valve housing. As shown in FIG. 1, the switch 53 is positioned above the upper portion 23 of the valve body which passes through the bore of the latch coil 33. The reed switch is in the configuration of that shown in FIG. 5 of the drawings, and has solid metallic contact members 54, 55 sealed in a glass envelope 56. The contact members are made of a magnetic material, and as in a majority of dry reed switch capsules, the actual points of contact of switching are appropriately plated with various precious metals such as gold, etc. The contact switching members are positioned inside a glass tube which is fused to the magnetic members to maintain specific contact spacing. The glass capsule is filled with an atmosphere for appropriate contact switching conditions which atmosphere may be of an inert gas or a high vacuum. The external portions 57 of the magnetic reed members are either plated or hot tin dipped to allow ease of solderability to terminals. The switch shown in FIG. 5 utilizes magnetic material switch members of identical size and shape with a gap located at approximately the center of the reed capsule. Both members are compliant and have approximately the same amount of flexure on the presence of an appropriate magnetic field. Upon application of current to the magnetic circuits shown in FIG. 1, for example, a magnetic field is established making one of the tips of the reed members the North Pole and the other a South Pole, so that the reed members will attract due to magnetic action. If the proper magnetic field is maintained, the contacts will close and exert the required amount of force to maintain circuit reliability. Upon removal of the influence of the magnetic circuit, the reed leads will return to their nonoperative position due to the tension of the reed leads.

In the operation of the reed switch with respect to the valve assembly shown in the drawings, the reed switch 53 is so positioned that during the release mode of operation of the valve, that is, when device 51 conducts and device 52 does not conduct, the flux path as shown in FIG. 1 permits the reeds within the switch to assume North-South polarity and thereby close due to this flux path along the upper flux plate. In the circuits shown in FIG. 3, this closing of the reed switch shorts the gate to a third gated power device 60 to common, whereupon the gated power device does not conduct, and a lamp 61 in the circuit is not operated. Under an opposite condition, that is, when the valve is latched with device 52 conducting and device 51 not conducting, the reed switch is opened because of its position over the center portion of the valve plunger whereupon opposing flux paths are influencing the switch and placing the reeds at the same or opposing polarities, thereby maintaining the reed contacts 54, 55 spaced apart to keep the switch open. In this condition, the current is applied to the gate of device 60 which causes it to conduct and permits the lamp or similar type of signalling device to be operated showing that the valve is in a latched or open position.

Figure 4:
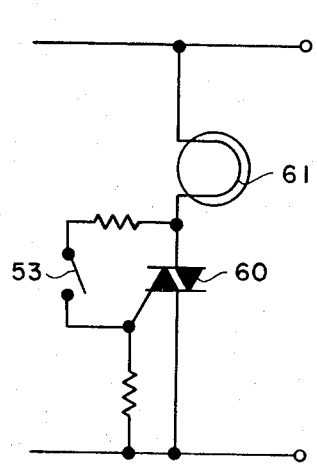
FIG. 4 shows an alternative circuit arrangement for the detecting portion of the system.

In order to reverse the signalling procedure, that is, to show when the valve is closed, the circuit of FIG. 4 will cause the switch to close and thereby apply a voltage to the gate of the power device 60 when the switch 53 is closed (released valve condition or closed valve condition) and thereby lighting the lamp 61 or otherwise operating a signalling device in the circuit. On the other hand, if the switch is open as is the condition during the latch condition of the valve, no voltage is applied across the gate and thus the power device 60 and lamp or signalling device 61 are not operated.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of this invention.

What is claimed is:

1. An apparatus for detecting the operation of a control device comprising: control means movable between first and second operating positions; a first magnetic flux path formed by the movement of said control means to one of said positions; a second magnetic flux path formed by the movement of said control means to the other of said positions; and magnetically actuated means responsive to the forming of one of said first and second magnetic flux paths for changing the characteristics of an electrical circuit and thereby providing an indication of the movement of the control means.

2. The apparatus of claim 1 wherein said magnetically actuated means is a reed switch.

3. The apparatus of claim 2 wherein said reed switch has elongated members with overlapping end portions movable into contact with one another, said elongated members having their longitudinal axis aligned parallel with said magnetic flux paths.

4. In a fluid flow control device having a valve movable between first and second operating positions and an electromagnetic system with first and second coils for forming first and second flux paths to operate the valve, an improved means for operating and detecting the operation of the fluid flow control device, which means comprises: first electronic gate means for passing a current to one of said first and second coils to form the first flux path; second electronic gate means for passing a current to other of said first and second coil to form the second flux path; and magnetically actuated means operable in response to the forming of a selected one of the first and second flux paths for providing an indication of the operation of the valve.

5. The apparatus of claim 4 and further including third electronic gate means operable in response to the operation of said magnetically actuated means for supplying power to a device signalling the forming of the selected one of the first and second flux paths.

6. The apparatus of claim 5 wherein said magnetically actuated means is a reed switch having elongated portions for contacting one another and arranged in parallel with and in the field of influence of the selected one of the first and second flux paths.

7. An apparatus for detecting the operation of an electromagnetically operated system which has a valve element movable between operable positions by energization of one of two magnetic flux paths of the valve system comprising: a reed switch having members arranged in an overlapping manner an spaced from one another, said reed switch being positioned on said valve system so that the longitudinal axis of said members are in coincidence with one of the valve system flux paths, said reed switch members being arranged to come into contact with one another in response to energization of said one of the magnetic flux paths of the valve system; and electrically operated means responsive to the contact of said members for providing a signal indicative of the change in the flux path.

* * * * *